United States Patent [19]

Jensen

[11] Patent Number: 5,647,698

[45] Date of Patent: *Jul. 15, 1997

[54] TIRE RASP BLADE

[75] Inventor: Wayne E. Jensen, Olympia Fields, Ill.

[73] Assignee: B & J Manufacturing Company, Glenwood, Ill.

[*] Notice: The term of this patent shall not extend beyond the expiration date of Pat. No. 5,283,935.

[21] Appl. No.: 487,500

[22] Filed: Jun. 7, 1995

Related U.S. Application Data

[63] Continuation of Ser. No. 144,578, Oct. 28, 1993, abandoned, which is a continuation of Ser. No. 657,565, Feb. 19, 1991, Pat. No. 5,283,935, which is a continuation-in-part of Ser. No. 344,920, Apr. 28, 1989, Pat. No. 5,054,177.

[51] Int. Cl.$^6$ .................................... B23D 71/00
[52] U.S. Cl. .................................... 407/29.12
[58] Field of Search .................................... 407/29.12

[56] References Cited

U.S. PATENT DOCUMENTS 2,975,504  3/1961  Bentham.

FOREIGN PATENT DOCUMENTS 1300102  12/1972  United Kingdom.

*Primary Examiner*—Jack W. Lavinder
*Attorney, Agent, or Firm*—Niro, Scavone, Haller & Niro

[57] ABSTRACT

A tire rasp blade is provided with an elongated planar body having a working portion comprising a plurality of uniformly and closely spaced teeth which define an arcuate working perimeter. Each of the teeth has a base and a working edge and is separated from neighboring teeth by generally elliptical primary cutouts which are oriented normal to the tangent of the working perimeter. The teeth are preferably monolithic and of a uniform size and shape, and are both angularly set and laterally displaced relative to the plane of the blade body.

23 Claims, 5 Drawing Sheets

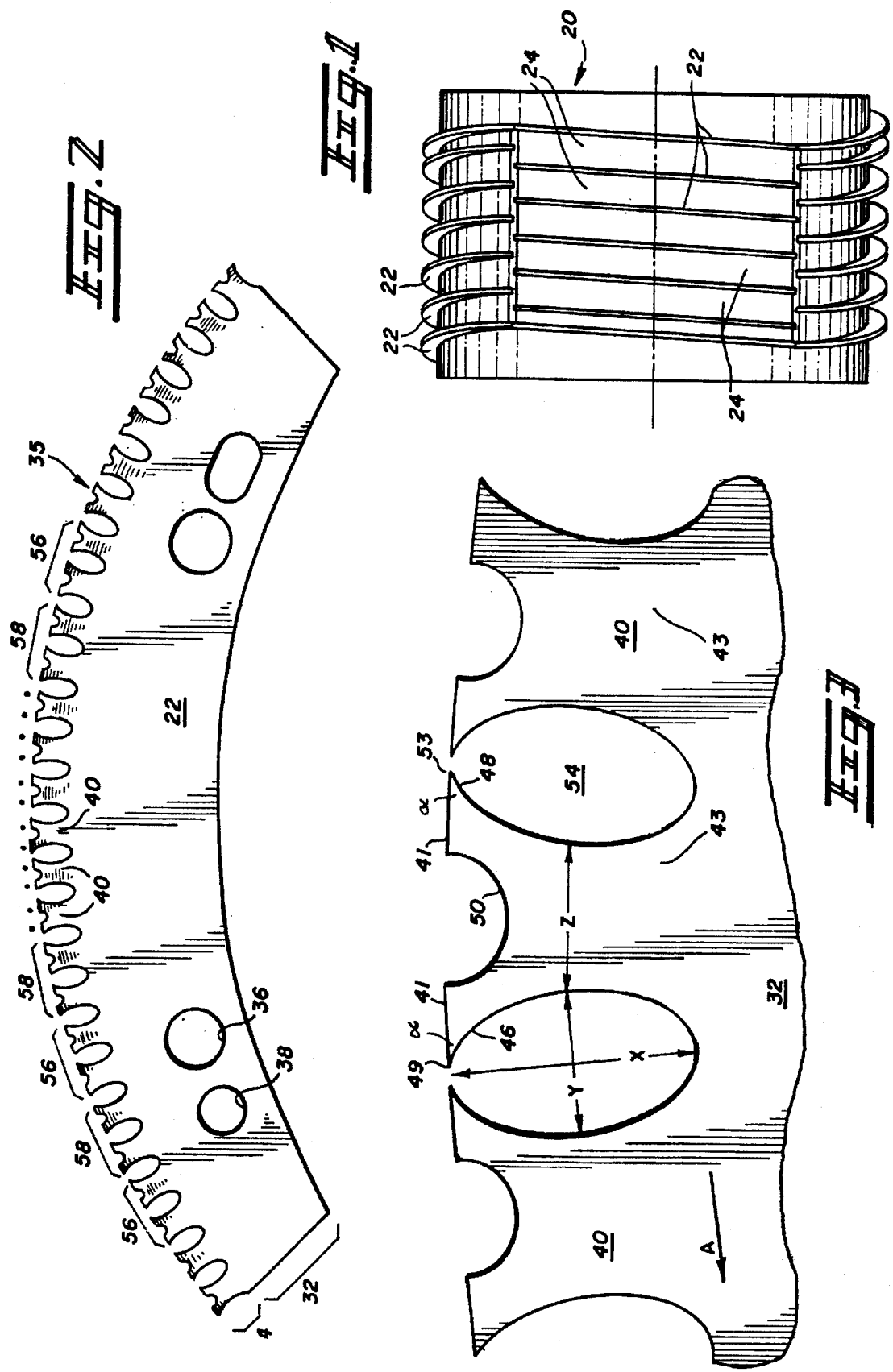

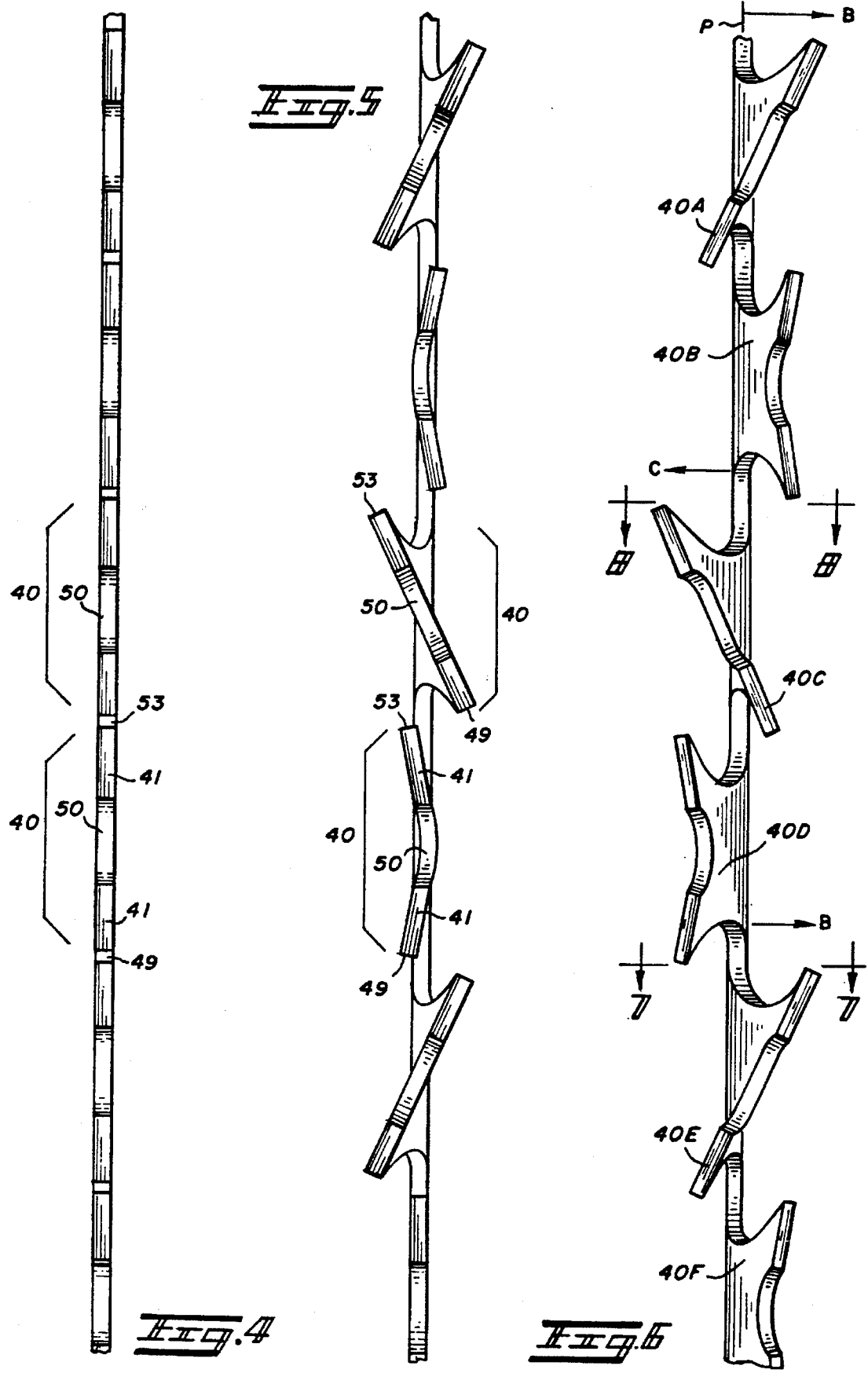

TIRE RASP BLADE

This is a continuation of application Ser. No. 08/144,578 filed on Oct. 28, 1993, now abandoned, which is a continuation of Ser. No. 07/657,565 filed Feb. 19, 1991 now U.S. Pat. No. 5,283,935, which is a CIP of 07/344,920 filed Apr. 28, 1989 now U.S. Pat. No. 5,054,177.

BACKGROUND OF THE INVENTION

The present invention relates to a new and uniquely constructed rasp blade for use in tire buffing machines to properly precondition tires in preparation for retreading. More particularly, the present invention relates to a tire rasp blade having a novel geometry and construction of the blade's working edge such that a greater number of teeth may be employed in a particular blade while retaining adequate tooth size, thus achieving maximum cutting efficiency, a longer useful life and other enhanced performance characteristics.

Tire rasp blades have been used for many years in the tire retreading industry. These blades are mounted to the rotating hub of the tire buffing machine and, when engaged with the used tire carcass, they cut or shear segments of rubber from the tread surface area of the tire. In this way, the tire is "buffed" to remove the unwanted used tread and to achieve an evenly textured surface suitable for retreading.

There are several distinct performance characteristics that are important to the successful operation and use of such tire rasp blades. The speed or efficiency of rubber removal during the tire buffing process is very important; by removing the unwanted rubber tread from the tire more quickly, the labor cost associated with the retreading process is reduced. It is also essential, however, that the tire rasp blade exhibit good durability—that is, the teeth positioned on the blade should not bend, break, wear or otherwise fail prematurely. It is also important that the blade not generate excessive heat during the buffing operation, since the tire surface can be damaged or even burned by increased temperatures with the result that an effective retread is not possible. Other important performance characteristics include the efficient utilization of energy and the generation of relatively low noise levels during operation. Finally, it is also very important that the tire rasp blade leave a certain well-defined texture on the surface of the tire carcass from which the unwanted rubber has been removed. Too rough a surface will result in a poor bond between the tire carcass and the new tread, thereby causing premature failure of the retreaded tire.

A number of prior art tire rasp blades have been developed in an attempt to meet the performance characteristics noted above. Such rasp blades are disclosed, for example, in U.S. Pat. Nos. 3,879,825; 4,021,899; 4,091,516; and 4,283,819. Another tire rasp blade construction, representing an improvement over these prior art structures, is disclosed in my U.S. patent application Ser. No. 07/166,176, filed Mar. 10, 1988. There still exists a need, however, for an economically produced tire rasp blade with excellent durability that removes rubber from the tire carcass at a faster rate, while providing an excellent surface texture on the buffed tire, and while maintaining relatively lower buffing temperatures.

There is also a present need in the tire retreading trade for a more durable, yet efficient tire rasp blade for use with both flat-faced and curved-face buffing hubs. The durability of the tire rasp blade used in curved-face buffing hubs is particularly important because fewer numbers of blades contact the tire at any one time during the operation of the curved-face hub, as compared to flat-faced hubs. Because a curved-faced buffing hub offers certain advantages over flat-faced hubs, a more durable, high performance blade for use in curved-faced hubs would make these hubs more attractive as alternatives to flat-faced hub assemblies.

SUMMARY OF THE INVENTION

The present invention is directed to a tire rasp blade found to overcome the problems associated with the prior art. The tire rasp blade constructed in accordance with the present invention is more efficient in removing rubber from the tread surface of the tire—it achieves rubber removal rates 50% to 100% greater than presently commercial tire rasp blades. It is also remarkably durable, with significantly less tooth breakage and a substantially longer useful working life than known commercial tire rasp blades. These improved performance characteristics are achieved, moreover, while still obtaining an excellent surface texture on the buffed tire and without generating excessive heat.

In accordance with the present invention, a tire rasp blade is provided for use in a tire buffing machine, and particularly a circumferential buffing machine, to remove rubber from a tire carcass. The tire rasp blade comprises an elongated body adapted for assembly in a rotating hub of the tire buffing machine and has a working portion including a plurality of uniformly and closely spaced teeth which together form an outside arcuate working perimeter protruding from the hub. Each of the teeth has a base and a working edge and is separated from its neighboring teeth by truncated generally elliptical primary cutouts oriented generally normal to the tangent of the working perimeter. Each of the teeth also has leading and trailing edges defined by the elliptical cutouts, with the leading edge and the working edge forming a leading angle having an apex that points in the direction of hub rotation, and the trailing edge and working edge forming a trailing angle having an apex that points away from the direction of rotation of the hub. Finally, the blade is symmetrical; that is, the tooth arrangement is identical regardless of the direction of blade movement during the buffing operation.

One of the important design principles of the present invention is the utilization of an increased number of teeth along the length of the blade achieved by novel tooth and blade geometry, while at the same time retaining adequate tooth size and an optimum orientation of the teeth relative to both the blade body and each other so that each tooth may most effectively address or attack the tire surface during the buffing operation. Those of ordinary skill in the art will recognize that while an increased number of teeth creates a greater potential for cutting efficiency, this may requires the use of smaller teeth, more susceptible to breakage. The present invention achieves the sought after balance of a greater number of teeth, while retaining adequate tooth size.

In accordance with the present invention, each of these objectives is achieved by a tire rasp blade having all of its teeth arranged along the blade's working portion in uniformly and closely spaced relation—each tooth being separated from its neighboring teeth by generally elliptical shaped primary cutouts. These cutouts are oriented to be generally normal to the tangent of the blade's working perimeter and are truncated by the working perimeter so that the trailing and leading apexes of neighboring teeth are closely spaced.

The teeth of the blade's working edge are also either laterally displaced or angularly set from the plane of the blade's body portion. Thus, the teeth are formed or bent at their base so that they are positioned at an angle to the plane of the base. Moreover, the teeth may be both laterally displaced and angularly set in such a manner that approximately one-half of the teeth is laterally displaced to one side and the other half is laterally displaced to the opposite side, while the angularly set teeth are set in different complimentary angles to the plane of the blade's body. The lateral displacement and angular set of the teeth, together with the unique geometery of the blade's body portion, permit the use of the maximum number of teeth while still achieving the balance of properties that are essential to satisfactory blade performance.

In accordance with a preferred embodiment of the invention, the teeth are laterally displaced and angularly set in groups or sets along the working edge of the blade. Most preferably, the teeth are positioned in groups of two, or pairs, with one tooth of a first pair being laterally displaced and the other tooth of that first pair being angularly set; then, in adjacent pairs, one tooth is laterally displaced in an opposite direction from the tooth laterally displaced in the first pair, while the other tooth is angularly set in a complimentary position from the angularly set tooth in the first pair. In this fashion, the teeth will most effectively address the rubber surface to be cut.

It has also been found in the practice of the present invention that various elements of the blade's geometry play an important part in optimization of blade performance. Moreover, the relationship of these various elements is also significant to blade performance. Thus, the spacing between teeth (later defined as the "spacing angle") and the size of the teeth (later defined as the "tooth size angle") and their relationship (later defined as the "tooth spacing to size ratio") all have been found to effect blade performance.

Moreover, the relative size of the teeth and primary cutouts may also be designed to achieve both the necessary close spacing of the teeth and enhanced heat transfer properties. In accordance with this embodiment of the invention, the minimum width of the blade's teeth is between about 80% and 110% of the maximum width of the primary elliptically shaped cutouts. This arrangement assures sufficient mass in the body of the tooth to achieve optimum strength and permit heat transfer or dissipation from the tooth's working edge through the base of the tooth and into the blade's body portion and the metal rasp hub, which together act as a heat sink. As a result, the teeth remain cooler during the buffing operation, giving the teeth greater durability and preventing heat build-up at the buffing interface between the blade and tire.

BRIEF DESCRIPTION OF THE DRAWINGS

The novel features of the invention are set forth in the appended claims. However, the invention's preferred embodiments, together with further objects and attendant advantages, will be best understood by reference to the following description taken in connection with the accompanying drawings in which:

FIG. 1 is an end view of a conventional flat-faced circumferential buffing machine hub and blade assembly;

FIG. 2 is a side elevational view illustrating a tire rasp blade made in accordance with one embodiment of the present invention;

FIG. 3 is an enlarged partial side elevational view of the working edge of the rasp blade of FIG. 2, illustrating the blade P at an intermediate stage of manufacture in accordance with the present invention;

FIG. 4 is a partial plan view of the working edge of the rasp blade of FIG. 3;

FIG. 5 is a plan view similar to that of FIG. 4, but showing the angular setting of the teeth at a later intermediate stage of manufacture;

FIG. 6 is a plan view similar to FIGS. 4 and 5, but showing the angular setting and lateral displacement of the teeth in the final construction of the tire rasp blade according to one embodiment of the present invention;

DESCRIPTION OF THE PREFERRED EMBODIMENTS

Figure 7:
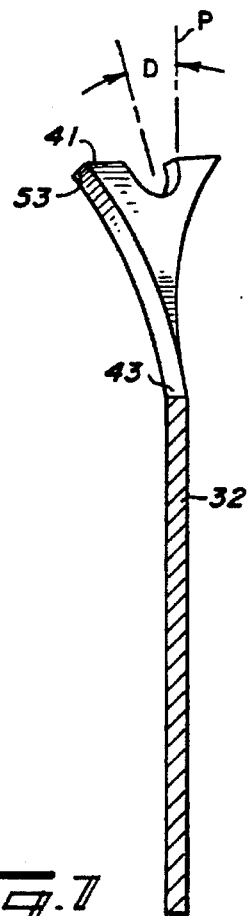
FIG. 7 is a cross-sectional view taken along line 7—7 of FIG. 6 and showing the angular set and lateral displacement of one tooth to one side of the blade body.

With reference to FIG. 1, a buffing machine hub assembly, designated generally as 20, is shown with a plurality of tire rasp blades 22 and spacers 24 mounted in a conventional operational arrangement. As can be seen, the blades 22 are mounted on the circumference of the hub at alternating angles to the direction of hub rotation. In this way, the blades create an oscillating, side-to-side action as the hub rotates during buffing. This is, of course, conventional and well known to those of ordinary skill in the art. As shown in FIG. 2, the tire rasp blade 22 includes a body 32 and a working portion 34. It will be appreciated by those skilled in the art that body 32 is generally planar and is adapted for assembly, by means of mounting holes 36 or 38, to the rotatable rasp hub as illustrated in FIG. 1. When properly assembled to the hub of the buffing machine the working portion has its outside arcuate working perimeter 35 protruding from the hub. Of course, a set of blades 22 are used in the machine hub assembly and together they act to remove rubber from the used tire carcass and to condition the tire tread surface area in preparation for a subsequent retreading process.

The working portion 34 of blade 22 is the outer, arcuate part of the blade that contacts the tire and includes a unique arrangement of teeth 40. The shape or geometric configuration of the teeth 40 may vary in accordance with the teachings of the prior art, such as U.S. Pat. Nos. 2,896,309; 3,082,506; 3,618,187; 3,879,825; 4,021,899; 4,059,875; and 4,091,516, the disclosures of which are incorporated herein by reference. However, the close and uniform positioning of each tooth relative to its neighboring teeth, the uniform tooth configuration, the combination of lateral displacement and angular set given to the teeth, and the use of generally elliptical and properly sized primary cutouts are all novel and unique to the present invention.

The initial stage of manufacture for the tire rasp blade 22 of the present invention is clearly illustrated in FIGS. 3 and 4. At this stage of manufacture, the generally planar body 32 is provided with generally elliptical primary cutouts 54 to form teeth 40. The teeth 40 are substantially the same size and configuration and each includes a working edge 41 and a base 43 which joins the tooth to the body 32 of the blade. Each tooth also includes a leading edge 46 which together with working edge 41 forms a leading angle "alpha". The leading angle "alpha" terminates in a leading apex 49 which points in the direction of hub rotation. Each tooth also includes a trailing edge 48 which together with working edge 41 forms a trailing angle "alpha". The trailing angle "alpha" terminates in a trailing apex 53 that points away from the direction of hub rotation. These leading edges 46 and trailing edges 48 are defined by the size and shape of the elliptical cutouts 54. The terms "leading" and "trailing" find their significance in relation to the movement of blade 22 as the rasp hub rotates. Blade movement, and hub rotation, are designated in the drawings by Arrow A. It is also desirable that each tooth include a centrally located semi-circular, v-shaped (or otherwise configured) cutout 50. This cutout 50 also provides blunt edges 51 along the working perimeter at the circular cutouts. These blunt edges allow the tire surface to be "buffed" after a leading or trailing edge has cut it; they also do not allow portions of the steel blade to snag on the tire rubber surface to be cut. The use of such a generally circular secondary cutout to form blunt edges 51 is, however, known to those of ordinary skill in the art.

Each of the primary cutouts 54 is generally elliptical in shape and is oriented such that its longitudinal axis is generally normal to the tangent of the working perimeter of the blade. The elliptical shape of the primary cutouts permits the use of teeth having sufficient size to achieve the desired strength while maintaining the desired closely spaced relationship, the necessary heat transfer properties, and an increased cutting efficiency. The elliptical cutouts 54 are truncated at the perimeter of the blade; this truncation allows the creation of an optimum angle "alpha", and still permits the closely spaced relation for leading and trailing apexes of neighboring teeth.

Figure 11:
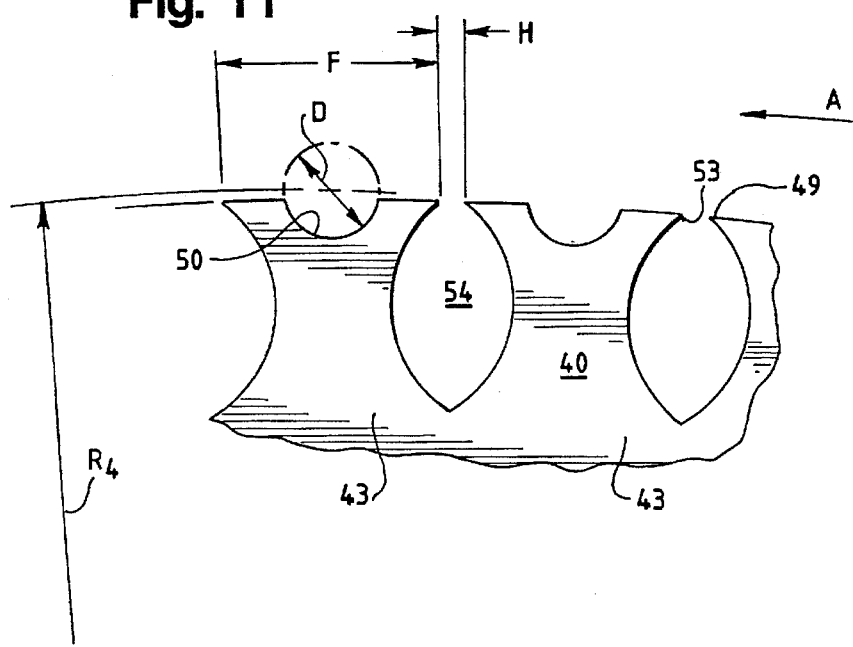
FIG. 11 is a partial enlarged side elevational view of FIG. 10 showing the novel geometric configuration of the blade working portion.
Figure 12:
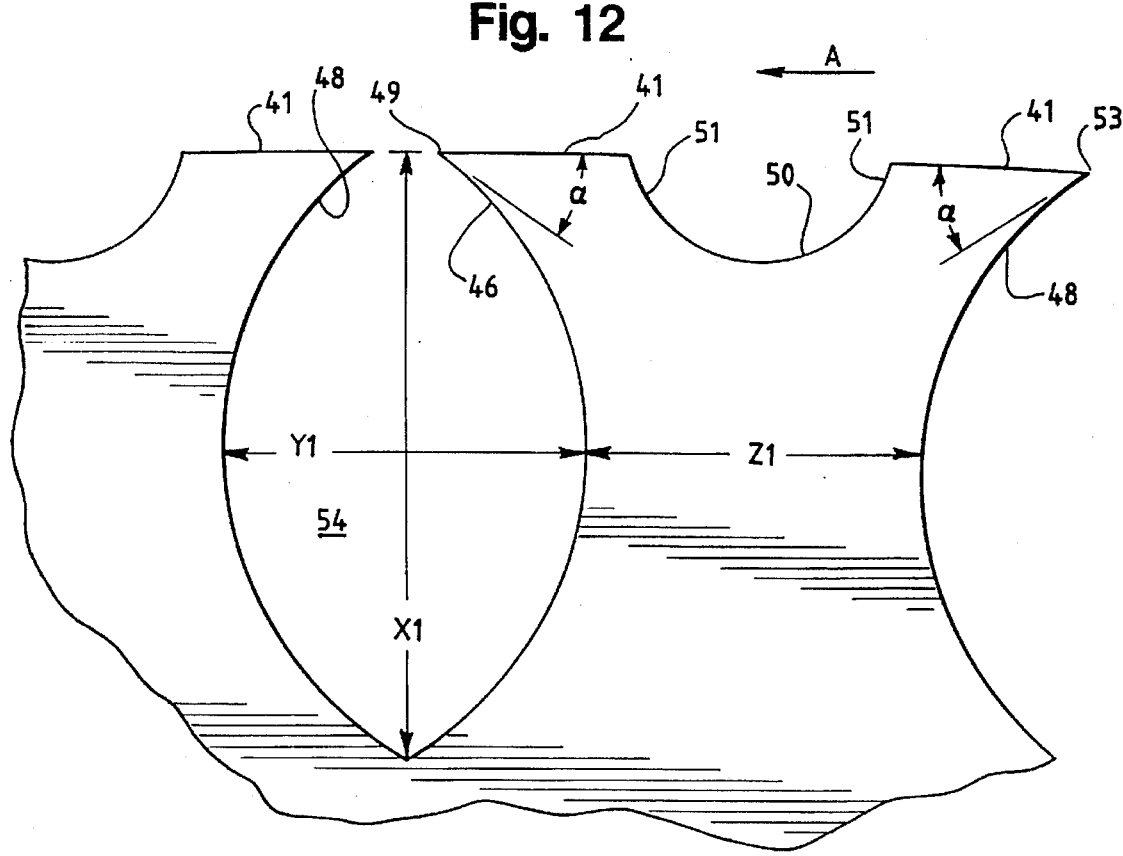
FIG. 12 is a further enlarged side elevational view of FIG. 11 illustrating the novel geometry of the blade teeth.

The use of novel, generally elliptical shaped primary cutouts allows the formation of various elements of the blade's working portion geometry, including the angles "alpha", "beta" and "omega" (see FIGS. 3, 11 and 12). The novel elliptical shape, for example, permits the formation of the preferred ranges for the angle "alpha", which must be large enough to avoid the "needling" effect which can occur with blade designs in which the leading and trailing apexes are so small as to be susceptible to breakage. This generally elliptical shape also permits the formation of preferred ranges for the angle "beta", also called the teeth "spacing angle"—the angle defined by two radii having centerpoint "CP", one of which, R1, intersects the apex of the trailing edge of one tooth, and the other of which, R2, intersects the apex of the leading edge of the next following tooth. The elliptical shape of the primary cutouts also permits the formation of preferred ranges for the angle "omega", also called the "tooth size angle"—the angle defined by two radii having centerpoint "CP", one of which, R2, intersects the apex of the leading edge of one tooth, and the other of which, R3, intersects the apex of the trailing edge of the same tooth.

Those of ordinary skill in the art will appreciate that the primary cutouts, while preferably elliptical, may also be merely generally elliptical: thus, other closely related geometric configurations are acceptable, as long as they retain the curved, oval shape. This curved oval shape is important, as it has been found that only this shape allows the formation of "closely spaced" teeth as taught by the present invention, yet also preserves the adequate tooth size necessary to prevent breakage and impart significant heat transfer capabilities to individual teeth.

One of the important design principles of the present invention is the use of "closely spaced" teeth in conjunction with teeth of an adequate size to reduce breakage while retaining cutting efficiency and significant heat transfer capabilities. Thus, the ratio of the spacing between adjacent teeth and the size of the tooth, also called the "tooth spacing to size ratio" (which by reference to FIG. 11 can be termed the H/F ratio), is less than 20% and, in the particularly preferred embodiment, is less than 15%.

As previously stated, the teeth 40 are initially formed in accordance with the present invention by first making the elliptical cutouts 54 in the blade 22 so that the trailing apex of one tooth is immediately adjacent to or virtually contiguous with the leading apex of the next following tooth. In the preferred embodiment of the present invention, the span between the trailing and leading apexes of teeth 40, after lateral displacement and angular setting, is less than about 0.025 inch. In the illustrated embodiment, the cutouts 54 are of substantially the same size, shape and depth, thereby defining teeth of substantially common size, configuration and height. Moreover, the spacing between neighboring teeth is kept to a minimum and is uniform from tooth to tooth.

By constructing the working edge 14 of the blade with uniformly and closely spaced teeth including the novel geometric configuration of generally elliptical primary cutouts, a maximum number of teeth and leading edges can be employed per unit length of the blade, while still preserving adequate tooth size and strength, and promoting a more aggressive action and faster rubber removal. And because more teeth are doing the work of rubber removal, each tooth is subject to less stress with the result that teeth of substantially the same configuration and dimension exhibit better wear, are more durable and less subject to breakage as compared to prior art blades. Moreover, by constructing the teeth and elliptical cutouts so that the minimum width of the teeth is between 80% and 110% of the maximum width of the elliptical cutouts, a sufficient amount of material is present in the "neck" of each tooth to efficiently transfer heat from the working edge 41 into the blade body 32 and buffing machine hub, which together act as a substantial heat sink. Further, the tooth arrangement is symmetrical, i.e., the tooth arrangement is identical regardless of the direction of blade movement during the buffing operation. This symmetrical tooth arrangement provides additional ease in operation, as the blades can thus be changed more quickly.

Another facet of the present invention is that the teeth 40 have a substantially monolithic construction; that is, the teeth have no holes, slits or other discontinuities between working edge 41 and base 43 to weaken the teeth or to inhibit heat transfer away from the working perimeter of the blade. Thus, the rasp blade exhibits improved durability and runs cooler even with a greater number of teeth per unit length of the blade.

Figure 8:
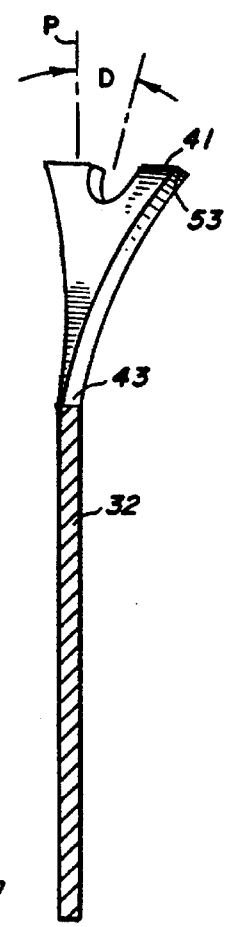
FIG. 8 is a cross-sectional view similar to that of FIG. 7, but taken along line 8—8 of FIG. 6, and showing the angular set and lateral displacement of another tooth to the opposite side of the blade body.
Figure 9:
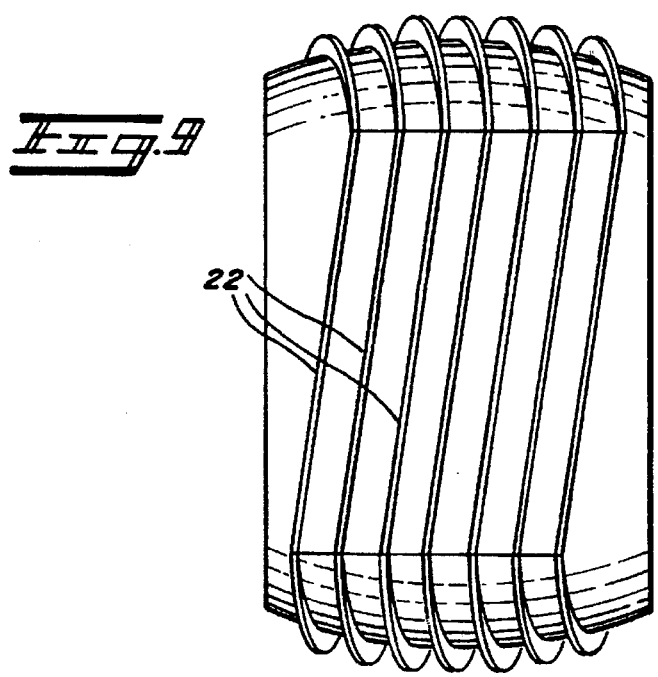
FIG. 9 is an end view showing the arrangement of the tire rasp blade of the present invention as mounted in a curve-faced tire buffing machine hub.
Figure 10:
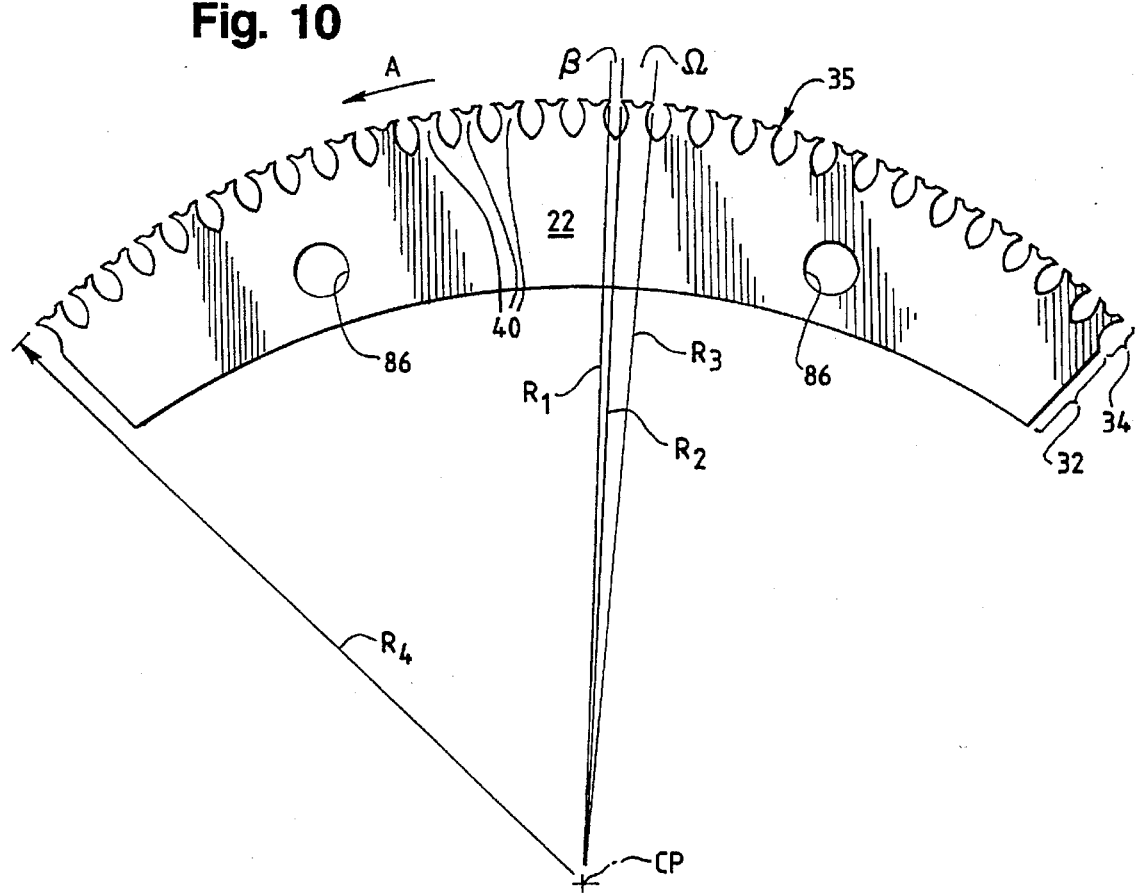
FIG. 10 is a side elevational view illustrating a tire rasp blade made in accordance with a particularly preferred embodiment of the present invention.

Still another facet of the tire rasp blade design of the present invention is the positioning and orientation of the teeth. It has been found in accordance with the present invention that by laterally displacing some of the teeth from the plane of the blade body, and giving other teeth an angular setting, a significant improvement in blade performance is achieved. As shown in FIGS. 6–8, the teeth may be laterally displaced to form an angle with the main plane P of blade body 32. In addition, it has been found important to blade performance that the teeth be displaced and/or set to both sides of the blade body. In the preferred embodiment of the invention, the adjacent teeth are displaced in groups of two, or pairs.

In the context of the present invention the term "laterally displaced" is intended to refer to a tooth 40 which is bent or formed at its base 43 so that the middlepoint of its free end 41 is offset relative to the centerline of the blade body 32. In other words, and as shown in FIGS. 7 and 8, the tooth 40 forms an angle D relative to the plane P of the blade body 32. In accordance with a particularly preferred embodiment of the present invention, the teeth 40 are laterally displaced from their base 41 at an angle of between 1° and 7° from the plane of the blade body. It has been found that at angles larger than 7° the teeth are less durable, and, at angles smaller than 1° the blade is not as efficient in the removal rate of rubber during the buffing operation.

In the context of the present invention the term "angularly set" is intended to refer to a tooth 40 that has been bent or formed at its base 43 such that the leading edge 46 and trailing edge 48 of the same tooth are on alternate sides of the centerline of the blade body 32, though the middlepoint of the tooth's free end 41 remains on the centerline of the blade body 32. A tooth that has been angularly set may also be laterally displaced by bending or forming the angularly set tooth such that the middlepoint of its free end 41 is offset relative to the centerline of the blade body 32. As shown in FIG. 5, this angular setting is preferably made in a repeating series or cycle of four teeth. Thus, tooth 40A is angularly set across the plane of the blade and tooth 40C is given an opposite angular setting. This cycle is repeated beginning with tooth 40E. Also, the teeth can be laterally displaced in pairs. Thus, as shown in FIG. 6, teeth 40A and 40B are displaced to one side of the blade in the direction of arrow B, whereas teeth 40C and 40D are displaced to the opposite side of the blade in the direction of arrow C. Again, the cycle is repeated with the displacement of teeth 40E and 40F in the direction of arrow B. This alternating lateral displacement is continued throughout the entire length of the blade 22.

When using closely spaced teeth, care must be taken to assure that their leading edges are positioned in relation to neighboring teeth to properly address the tire surface for effective rubber removal. Thus, the trailing edge of one tooth must always be laterally displaced or angularly set on the opposite side to which the leading edge of the next following tooth is displaced or set. This tooth arrangement ensures that the leading and trailing apexes of each tooth, together with the respective trailing and leading edges, may be arranged to properly address the tire for efficient rubber removal. Accordingly, in the next phase of the manufacturing process, some of the teeth 40 are angularly set relative to blade body 32 as illustrated in FIG. 5, while others are laterally displaced across the plane of blade body 32.

All of these design parameters are employed in the tire rasp blades illustrated in the drawings. The blade 22 shown in FIG. 2, for example, has a working perimeter 35 with a longitudinal (i.e. circumferential) dimension of approximately 7.0 inches. All of the teeth are closely and uniformly spaced along the length of the blade thereby permitting as many as twenty-eight teeth in a single blade. There are also groups 56 of two teeth displaced to one side along the blade's length, and alternating groups 58 of two teeth displaced to the opposite side. Each of the teeth is bent from its respective base 43 at an angle of approximately between 1° and 7° from the plane of body 32.

Preferably, the elliptical cutout 54 has a longitudinal dimension X which is about between 1.5 and 1.75 times its maximum width Y. In accordance with a particularly preferred embodiment of the invention, the longitudinal dimension of the cutout 54 is at least 0.200 inch while its maximum width Y is about 0.120–0.130 inch and the minimum width Z of tooth 40 is about 0.110–0.120 inch. In this embodiment, the spacing between the leading and trailing apexes of neighboring teeth is about between 0.015–0.030 inch. In an exemplary embodiment, the spacing between the leading and trailing apexes of neighboring teeth is about 0.020–0.030 inch. In this exemplary embodiment, the dimension of tooth 40 along its working edge 41 from leading apex 49 to trailing apex 53 is about 0.220–0.250 inch and cutout 50 has a diameter of about 0.090–0.120 inch. Therefore, in this embodiment the spacing between leading and trailing apexes of adjacent teeth is less than 20% of the tooth length along its working edge 41.

Figure 13:
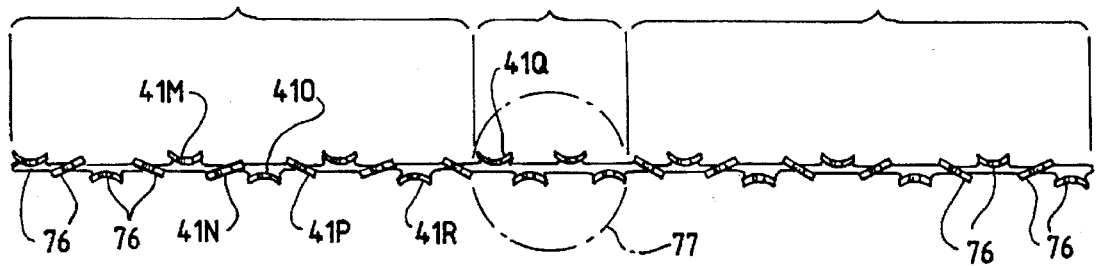
FIG. 13 is a plan view of a particularly preferred embodiment of the working perimeter of the rasp blade of FIG. 10.

FIGS. 10–13 illustrate a particularly preferred embodiment of the present invention. Thus, referring now to FIG. 10, a tire rasp blade 22 has a working perimeter 34 with a longitudinal (i.e. circumferential) dimension of approximately 7.0 inches. This circumferential dimension is approximately equal to the arc of a circle with a 9 inch diameter, with the arc extending along one-fourth (90°) of the circle. Two other preferred embodiments (not disclosed in the drawings) include tire rasp blades with a working perimeter whose circumferential dimensions are approximately equal to the arc of a circle with an 11.5 inch diameter, with the arc extending along one-sixth (60°) and one-fifth (72°) of the circle, respectively. Body 32 is again generally planar and is adapted for assembly, by means of mounting holes 86, to the rotatable rasp hub as illustrated in FIG. 1. All of the teeth are closely and uniformly spaced along the length of the blade as described previously, thereby permitting twenty-eight teeth in the single blade. Referring now to FIG. 13, there are also groups or pairs 76 of two teeth. These groups form a repeating pattern of four teeth with, for example, tooth 41M laterally displaced to one side along the blade's length, tooth 41N angularly set in one direction, and teeth 41O and 41P in an adjacent pair laterally displaced and angularly set in correspondingly opposite directions, respectively. Each of the laterally displaced teeth is bent from its respective base 43 at an angle of approximately between 1° and 7° from the plane of body 32. However, the middle group 77 of four teeth, of the twenty-eight teeth show in FIG. 13, do not follow the above described pattern. Instead, these teeth are alternately laterally displaced, with tooth 41Q laterally displaced "up", for example, and the next tooth displaced "down". Additionally, the first tooth 41Q of the middle four teeth is laterally displaced in the direction opposite to the lateral displacement of the second tooth 41R preceding it. This particular pattern of lateral displacement and angular setting has been found to provide an extremely durable rasp blade which maximizes cutting efficiency while employing a symmetrical tooth arrangement to achieve the necessary buffed tire surface.

Referring again to FIGS. 10–13, the particularly preferred embodiment will now be more specifically and dimensionally described. Thus, R4, the radius measured from the center "CP" of the circle formed by extending the arcuate working edge is approximately 4.50 inch.

As explained above, the novel shape of the primary cutouts allows the selection of the preferred ranges for the angles "alpha", "beta" and "omega". Thus, "alpha" is about 35°, while its preferred working range is between 30° and 40°. It has been found that an "alpha" angle less than about 30° results in premature wear and tooth deformation whereas angles greater than about 40° reduce rubber removal efficiency and increase operating temperatures. The spacing angle "beta" is about 0.25°, while its preferred working range is less than 0.50°. It has been found that a "beta" angle above about 0.50° is too large and results in too few teeth along the blade's working perimeter, thereby reducing rubber removal efficiency. Finally, the tooth size angle "omega"—is about 3°, while its preferred working range is between about 2.75° and 3.25°. When the "omega" angle is below about 2.75°, the teeth have insufficient strength and are subject to early failure, while angles above about 3.25° reduce the number of teeth per unit length of blade and result in reduced rubber removal efficiency.

Still referring to FIGS. 10-13, tooth size is generally defined by the following dimensions: 1) "F", the distance between leading and trailing apexes, is 0.230 inch; 2) "T", the distance along the working edge from a leading or trailing apex to the blunt edge 51 of a secondary circular cutout, is 0.070 inch; 2) Z1, the minimum width of a tooth, is 0.117 inch; 3) X1, the longitudinal distance of the primary cutouts, is 0.209 inch; and 4) Y1, the maximum width of the primary cutout, is 0.127 inch. These five parameters, "F", "T", "Zi", "Xi" and "Yi", together form a blade with sufficiently large teeth to resist wear and breakage and promote heat transfer, yet provide closely spaced teeth to ensure a maximum number of teeth (the existence of which increases both cutting efficiency and durability). In fact, the novel tooth configuration and blade geometry of the present invention allows truly "closely spaced" teeth: the distance "H" between the leading apex of one tooth and the trailing apex of an adjacent tooth in the particularly preferred embodiment is about 0.023 inch. Thus, the H/F ratio for this embodiment is about 10%.

Referring still to FIGS. 10-13, the secondary cutouts are generally defined by the following dimensions: 1) "J", the depth of the circular secondary cutout, is 0.036 inch; 2) D2, the diameter of the circular secondary cutout, is 0.094 inch; and 3) "G", the length of the circular cutout along the working perimeter, is 0.091 inch. These three parameters, "J", "D2", and "G" together form a circular cutout with blunt edges for imparting a buffing action to the tire surface, yet still allow the formation of a large, durable, tooth that cuts highly efficiently and retains significant heat transfer capabilities.

This particularly preferred embodiment of the tire rasp blade of the present invention, described above, exhibits exceptional rubber removal rates when used in conventional buffing machines—as much as 50%–100% faster than the known higher performance prior art blades. As a result, significant labor savings can be achieved in the retreading process with virtually no additional capital expense. Equally important, the blade produces a very high quality tread surface area texture without generating excessive heat. And all of this is achieved while retaining outstanding durability—as much as 60%–100% longer useful life. In short, the tire rasp blade of the present invention significantly outperforms any other known prior art blade.

The tire rasp blade of the present invention finds particularly advantageous use in combination with circumferential buffing machines and also curved face buffing machines. Moreover, it exhibits outstanding durability and strength when used with well known problem tires, such as high mileage steel belted radial tires using high durometer rubber compositions.

Of course, it should be understood that various changes and modifications to the preferred embodiments described herein will be apparent to those skilled in the art. Such modifications and changes can be made to the illustrated embodiments without departing from the spirit and scope of the present invention, and without diminishing the attendant advantages. It is, therefore, intended that such changes and modifications be covered by the following claims.

I claim:

1. A tire rasp blade for use in a tire buffing machine to remove rubber from a tire, said tire rasp blade comprising:

an elongated body adapted for assembly in a rotating hub of the tire buffing machine;

said body including a working portion comprising a plurality of closely spaced teeth having substantially the same size and configuration and together forming an arcuate working perimeter protruding from the hub;

each of said teeth having a base and a working edge and being separated from neighboring teeth by truncated generally elliptical primary cutouts, the longitudinal axis of each of said cutouts being oriented generally normal to the tangent of said working perimeter, each of said teeth also having leading and trailing edges defined by said cutouts, said leading edge and said working edge forming a leading angle having a leading apex that points in the direction of hub rotation, and said trailing edge and said working edge forming a trailing angle having a trailing apex that points away from the direction of hub rotation, said leading and trailing angles being between about 30° and 40°; and said teeth being uniformly and closely spaced so that the trailing apex of each tooth and the leading apex of the next following tooth form a spacing angle less than about 0.50°.

2. The tire rasp blade of claim 1 wherein said working portion includes at least 28 teeth.

3. The tire rasp blade of claim 1 wherein said teeth are monolithic and the leading and trailing apexes of each of said teeth are separated by generally circular and truncated secondary cutouts.

4. The tire rasp blade of claim 1 wherein said leading and trailing apexes of neighboring teeth are within less than 0.030 inch.

5. The tire rasp blade of claim 1 wherein the length of each of said elliptical cutouts, measured along a line generally normal to the working perimeter, is greater than one and one half times the maximum width of each of said generally elliptical primary cutouts.

6. The tire rasp blade of claim 1 wherein said leading angle is approximately equal to said trailing angle.

7. A tire rasp blade for use in a tire buffing machine to remove rubber from a tire, said tire rasp blade comprising:

an elongated body adapted for assembly in a rotating hub of the tire buffing machine;

said body having a working portion comprising a plurality of uniformly and closely spaced teeth together forming an arcuate working perimeter protruding from the hub;

each of said teeth having a base and a working edge and being separated from neighboring teeth by truncated generally elliptical primary cutouts, the longitudinal axis of each of said cutouts being oriented generally normal to the tangent of said working perimeter, each of said teeth also having leading and trailing edges defined by said cutouts, said leading edge and said working edge forming a leading angle having a leading apex that points in the direction of hub rotation, and said trailing edge and said working edge forming a trailing angle having a trailing apex that points away from the direction of hub rotation; and a first portion of said teeth being laterally displaced to one side of said body and a second portion of said teeth being laterally displaced to the other side of said body, whereby said teeth form an angle to the plane of said body between about 1° and 7°.

8. The tire rasp blade of claim 7 wherein said working portion includes at least 28 teeth.

9. The tire rasp blade of claim 7 wherein said teeth are monolithic and the leading and trailing apexes of each of said teeth are separated by generally circular and truncated secondary cutouts.

10. The tire rasp blade of claim 7 wherein said leading and trailing apexes of neighboring teeth are within less than 0.030 inch.

11. The tire rasp blade of claim 7 wherein the length of each of said elliptical cutouts, measured along a line generally normal to the working perimeter, is greater than one and one half times the maximum width of each of said generally elliptical primary cutouts.

12. The tire rasp blade of claim 7 wherein the minimum width of each of said teeth is between 80% and 110% of the maximum width of each of said generally elliptical primary cutouts.

13. A tire rasp blade for use in a tire buffing machine to remove rubber from a tire, said tire rasp blade comprising:
an elongated planar body adapted for assembly in a rotating hub of the tire buffing machine;
said body having a working portion comprising a plurality of uniformly and closely spaced teeth together forming an arcuate working perimeter protruding from the hub;
each of said teeth having a base and a working edge and being separated from neighboring teeth by truncated generally elliptical primary cutouts, the longitudinal axis of each of said cutouts being oriented generally normal to the tangent of said working perimeter, each of said teeth also having leading and trailing edges defined by said cutouts, said leading edge and said working edge forming a leading angle having a leading apex that points in the direction of hub rotation, and said trailing edge and said working edge forming a trailing angle having a trailing apex that points away from the direction of hub rotation;
said teeth also being of substantially the same size and configuration with a minimum width between about 80% and 110% of the maximum width of each of said generally primary cutouts; and
said teeth being arranged such that the trailing edge of each tooth is positioned on the opposite side of the plane of said body to the leading edge of the next following tooth.

14. The tire rasp blade of claim 13 wherein said working portion includes at least 28 teeth.

15. The tire rasp blade of claim 13 wherein said teeth are monolithic and the leading and trailing apexes of each of said teeth are separated by generally circular and truncated secondary cutouts.

16. The tire rasp blade of claim 13 wherein the length of each of said elliptical cutouts, measured along a line generally normal to the working perimeter, is greater than one and one half times the maximum width of each of said generally elliptical primary cutouts.

17. A tire rasp blade for use in a tire buffing machine to remove rubber from a tire, said tire rasp blade comprising:
an planar elongated body adapted for assembly in a rotating hub of the tire buffing machine;
said body having a working portion comprising a plurality of uniformly and closely spaced teeth together forming an arcuate working perimeter protruding from the hub;
each of said teeth having a base and a working edge and being separated from neighboring teeth by truncated generally elliptical primary cutouts, the longitudinal axis of each of said cutouts being oriented generally normal to the tangent of said working perimeter, each of said teeth also having leading and trailing edges defined by said cutouts, said leading edge and said working edge forming a leading angle having a leading apex that points in the direction of hub rotation, and said trailing edge and said working edge forming a trailing angle having a trailing apex that points away from the direction of hub rotation, said leading and trailing angles being between about 30° and 40°;
said teeth being uniformly and closely spaced so that the trailing apex of each tooth and the leading apex of the next following tooth form a spacing angle less than about 0.50°;
said teeth also being of substantially the same size and configuration with a minimum width between about 80% and 110% of the maximum width of each of said generally primary cutouts;
said teeth being arranged such that the trailing edge of each tooth is positioned on the opposite side of the plane of said body to the leading edge of the next following tooth; and
the tooth spacing to size ratio being less than about 20%.

18. The tire rasp blade of claim 17 wherein said working portion includes at least 28 teeth.

19. The tire rasp blade of claim 17 wherein said teeth are monolithic and the leading and trailing apexes of each of said teeth are separated by generally circular and truncated secondary cutouts.

20. The tire rasp blade of claim 17 wherein said leading and trailing apexes of neighboring teeth are within less than 0.030 inch.

21. The tire rasp blade of claim 17 wherein the minimum width of each of said teeth is between 80% and 110% of the maximum width of each of said generally elliptical primary cutouts.

22. The tire rasp blade of claim 17 wherein said leading angle is approximately equal to said trailing angle.

23. A tire rasp blade for use in a tire buffing machine to remove rubber from a tire, said tire rasp blade comprising:
an elongated body adapted for assembly in a rotating hub of the tire buffing machine;
said body having a working portion comprising a plurality of uniformly and closely spaced teeth together forming an arcuate working perimeter protruding from the hub;
each of said teeth having a base and a working edge and being separated from neighboring teeth by truncated generally elliptical primary cutouts, the longitudinal axis of each of said cutouts being oriented generally normal to the tangent of said working perimeter, each of said teeth also having leading and trailing edges defined by said cutouts, said leading edge and said working edge forming a leading angle having a leading apex that points in the direction of hub rotation, and said trailing edge and said working edge forming a trailing angle having a trailing apex that points away from the direction of hub rotation;
said teeth also being: substantially the same size and configuration so that the leading apex and trailing apex of each tooth form a tooth size angle between about 2.75 degrees and 3.25 degrees; and
the tooth spacing to size ratio being less than about 20% wherein the minimum width of each of said teeth is between 80% and 110% of the maximum width of each of said generally elliptical primary cutouts.

* * * * *